United States Patent [19]

Jones

[11] 4,063,683

[45] Dec. 20, 1977

[54] RADIO MOUNTING BRACKET

[76] Inventor: Leslie R. Jones, 432 Steely St., West Lafayette, Ind. 47906

[21] Appl. No.: 699,470

[22] Filed: June 24, 1976

[51] Int. Cl.$^2$ ............................................ H01R 13/60
[52] U.S. Cl. .............................. 339/119 R; 339/91 R; 339/125 R
[58] Field of Search .................... 70/58, 258; 248/203; 312/7 TV, 7 R; 339/65, 91 R, 119 R, 125 R

[56] References Cited

U.S. PATENT DOCUMENTS

| 3,563,070 | 2/1971 | Earl | 70/58 X |
| 3,822,049 | 7/1974 | Saunders | 70/258 X |
| 3,965,705 | 6/1976 | Nadler | 248/203 X |

Primary Examiner—Roy Lake
Assistant Examiner—E. F. Desmond

Attorney, Agent, or Firm—Tilton, Fallon, Lungmus & Chestnut

[57] ABSTRACT

A bracket for mounting a radio in a vehicle including a base member for attaching the bracket to the vehicle and an adjustable body member for releasably receiving the radio with the body member being connected to the base member for swivel movement of the radio on the bracket. The body member includes a pair of overlapping plates joined for relative sliding movement and the overlapping plates terminate in radio supporting channels. The body member also includes power and antenna cable connectors and the connectors automatically engage corresponding connectors on the radio. The bracket can be utilized for automatically mounting a radio in a vehicle for use by sliding the radio on the channels of the overlapping plates of the body member until the connectors on the body member matingly engage the connectors on the radio and the radio can thereafter be swiveled on the bracket.

16 Claims, 1 Drawing Figure

U.S. Patent
Dec. 20, 1977
4,063,683
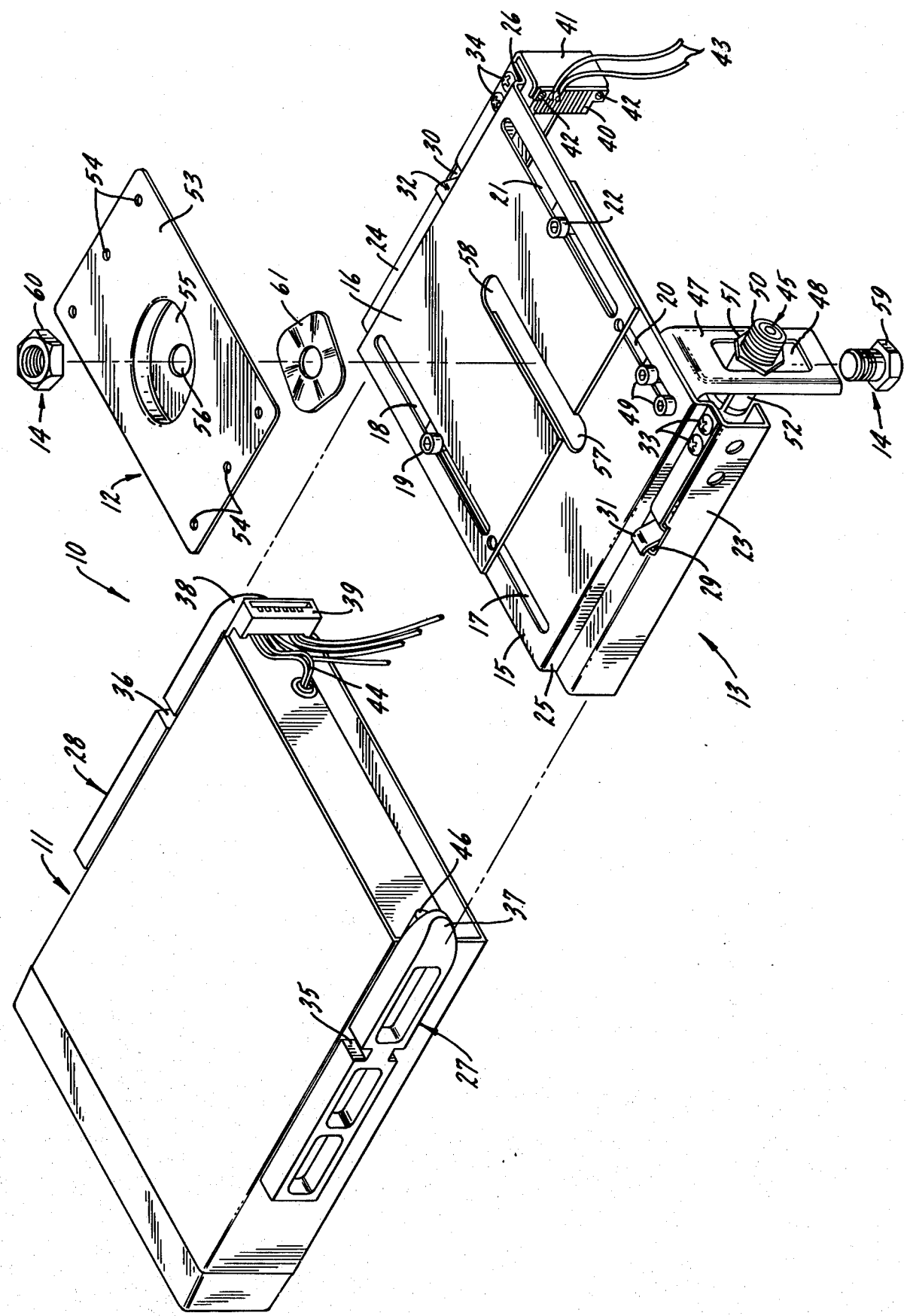

RADIO MOUNTING BRACKET

BACKGROUND

The present invention relates to a bracket and more particularly to a bracket for mounting a radio or the like in a vehicle.

A conventional radio has been a common accessory item in vehicles of all types for many years. Manufacturers have given recognition to the large demand for radios of this type by providing suitable openings in the dashboards of vehicles designed for permanent installation. The dashboard openings have not been uniform in size, however, making it impossible to design a single radio adapted for use in all vehicles. Radios capable of permanent installation in the openings in the dashboards of particular vehicles, therefore, have included only those provided by the manufacturer and those provided by independent sources making a multitude of sizes. As a result, other independent sources have had to search for alternative ways of mounting a conventional radio in a vehicle.

The development of compact stereo tape players has also made it a rather common accessory item for use in vehicles of all types in the past few years. The large demand for stereo tape players has now been responded to by some manufacturers with openings in the dashboards of vehicles designed for permanent installation. The only stereo tape players suitable for use in the dashboards of particular vehicles, however, have again been those provided by the manufacturer and those provided by independent sources making a multitude of sizes since the openings have not been uniform in size. Accordingly, other independent sources have similarly had to search for alternative ways of mounting a stereo tape player in a vehicle.

An even more recent phenomenon has been the incredible sales of Citizen's Band radios as an accessory item for use in vehicles of all types. Manufacturers have not provided suitable openings in the dashboards of vehicles designed for permanent installation in recognition of the large demand for C.B. radios and such radios have only been available from independent sources. As a result, all independent sources have likewise had to search for alternative ways of mounting Citizens' Band radios in a vehicle.

A problem accompanying the large sales of Citizens' Band radios has been an equally large theft rate. The problem has become so severe that the search for ways of mounting C.B. radios in a vehicle has been equally directed to ways of reducing or preventing theft. The lack of a means for permanently installing C.B. radios in dashboard openings of a vehicle, however, has frustrated the search since less permanent installations have easily been circumvented. Accordingly, the problems associated with mounting Citizens' Band radios as well as stereo tape players and conventional radios of independent sources in vehicles has been a vexing one which has, to date, not been satisfactorily resolved.

The most common mounting for Citizens' Band radios, stereo tape players, and conventional radios of independent sources has been on brackets provided by each source such as those disclosed in U.S. Pat. Nos. 3,822,049 and 3,087,118. The brackets have not proven to be fully satisfactory, however, for a number of reasons. First, the brackets are generally not adjustable to accommodate radios and the like of varying size. Second, the brackets have generally not included power and antenna cable connectors adapted to automatically engage corresponding connectors on a radio. Third, the brackets have generally not provided swivel movement for operation of the radio or the like from different positions. The brackets most commonly used for mounting a radio or the like in a vehicle have, therefore, not effectively provided the desired degree of versatility for use with any Citizens' Band radio, stereo tape player, or conventional radio under a wide variety of conditions. As a result, the brackets of the past have all failed to accomplish the important advantages to be derived from the present invention.

SUMMARY OF THE INVENTION

The bracket of the present invention is particularly well suited for mounting a radio or the like in a vehicle. The bracket includes a base member for attaching the bracket to the vehicle, an adjustable body member for releasably receiving the radio, and means for connecting the body member to the base member for swivel movement of the radio on the bracket. The body member preferably includes a pair of overlapping plates joined for relative sliding movement for adjusting the width of the body member. The overlapping plates desirably include slots which register for guiding the relative sliding movement with a bolt joining the overlapping plates through the slots. The overlapping plates can advantageously include second slots which register with a second bolt joining the overlapping plates through the second slots. The overlapping plates also desirably terminate in radio supporting channels which face inwardly for slidably receiving a pair of rails provided for attachment to opposing sides of the radio. The channels preferably include openings for receiving spring detents normally urged through the openings into the channels for engaging notches in the rails.

The rails preferably include tapered ends for guiding the rails into the channels of the body member. The body member desirably includes a power plug for transmitting power to the radio through a power receptacle associated with one of the rails. The receptacle and the plug can advantageously be placed in substantial alignment so that the plug automatically matingly engages the receptacle when the body member receives the radio. The body member also desirably includes an adjustable cable connector for engagement with a cable plug extending from the radio. The cable connector preferably is attached to the body member on the holder bracket for adjustment in a first and a second direction.

The base member preferably includes a plate for attaching the bracket to the vehicle with the plate having an enlarged central aperture for receiving a bolt. The body member desirably includes an enlarged slot in each of the overlapping plates of the body member with the slots in registration. The means for connecting the body member to the base member for swivel movement can advantageously include a bolt extending through the slots in the overlapping plates of the body member and the aperture in the base member with the bolt being secured by a nut. The connecting means also preferably includes a washer disposed between the base member and the body member on the bolt to facilitate swivel movement of the radio on the bracket.

The bracket of the present invention having these various features offers the significant advantage of overcoming the inherent limitations of the brackets used for mounting Citizens' Band radios, stereo tape players and conventional radios in vehicles in the past. A bracket is provided which can be adjusted to receive and support radios of varying size and to automatically connect and disconnect the power and cable lines between the vehicle and the radio while at the same time facilitating swivel movement. Accordingly, the present invention provides advantages in a bracket for mounting a radio in a vehicle with adjustability features which permit rapid installation and removal as well as swivel movement of the radio on the bracket.

It is therefore an object of the present invention to provide a bracket for mounting nearly any Citizens' Band radio, stereo tape player or conventional radio in a vehicle for rapid installation and removal as well as swivel movement. The provision of the structure and the realization of the advantages derived therefrom constitute additional important objects of this invention. Other objects of the present invention can be appreciated from the details of construction and operation set forth in the accompanying specifications, claims and drawings.

BRIEF DESCRIPTION OF THE DRAWING

An illustrative embodiment of a bracket for mounting a radio or the like in a vehicle in accordance with the present invention is shown in an exploded perspective view in the accompanying drawing.

DETAILED DESCRIPTION OF THE INVENTION

In the illustration given and with reference to the drawing, the numeral 10 designates generally a bracket in accordance with the present invention. The bracket 10 has been shown for mounting a Citizens' Band radio 11 primarily for purposes of illustrating one of many advantageous applications of the invention. The details of construction of the Citizens' Band radio 11 are therefore not believed to be important for purposes of obtaining a thorough and proper understanding of the invention. Accordingly, it will be understood throughout the description which follows that the bracket 10 is equally well suited for mounting Citizens' Band radios, stereo tape players, conventional radios, and the like within the contemplation of the present invention.

The bracket 10 which is provided for mounting the radio 11 in a vehicle generally includes a base member 12, an adjustable body member 13, and means 14 for connecting the body member 13 to the base member 12. The base member 12 is utilized for attaching the bracket 10 to the vehicle and the body member 13 is utilized for releasably receiving the radio 11. The connecting means 14 is provided for facilitating swivel movement of the radio 11 on the bracket 10.

The body member 13 includes a pair of overlapping plates 15 and 16 joined for relative sliding movement for adjusting the width of the bracket 10. The overlapping plates 15 and 16 have respective slots 17 and 18 which guide the sliding movement. The slots 17 and 18 register with a bolt 19 (shown in part) extending through the slots 17 and 18 to join the overlapping plates 15 and 16 and the sliding movement is guided along the slots 17 and 18 by the bolt 19. The overlapping plates 15 and 16 also have second slots 20 and 21 which further guide the sliding movement. The second slots 20 and 21 also register with a second bolt 22 (shown in part) extending through the second slots 20 and 21 to join the overlapping plates 15 and 16 and the sliding movement is then guided along the second slots 20 and 21 by the second bolt 22. The second slots 20 and 21 are substantially parallel to the slots 17 and 18 and the relative sliding movement of the overlapping plates 15 and 16 is therefore confined to a single direction to provide the width adjustment feature of the bracket 10.

The overlapping plates 15 and 16 terminate in inwardly facing radio supporting channels 23 and 24 which are slightly spaced from the overlapping plates 15 and 16 by offsets 25 and 26. The channels 23 and 24, which are provided for slidably receiving a pair of rails 27 and 28 attached to opposing sides of the radio 11, have openings 29 and 30 for receiving spring detents 31 and 32. The spring detents 31 and 32 are normally urged through the openings 29 and 30 into the channels 23 and 24 and can advantageously be secured by pairs of screws 33 and 34 to the channels 23 and 24. The rails 27 and 28 include tapered ends 37 and 38 which facilitate guiding the rails 27 and 28 into the channels 23 and 24 and notches 35 and 36 are provided for releasably receiving the spring detents 31 and 32 as the rails 27 and 28 slide along the channels 23 and 24.

One of the rails 28 includes a power receptacle 39 for delivering power to the radio 11 and the body member 13 includes a power plug 40 for delivering power to the receptacle 39. The receptacle 39 and the plug 49 can advantageously be placed in substantial alignment so that the plug 40 automatically matingly engages the receptacle 39 when the body member 13 receives the radio 11. The plug 40 is attached to the channel 24 on a U-shaped bracket 41 with screws 42 and the receptacle 39 is integral with the rail 28 adjacent the tapered end 38.

The power plug 40 is preferably a multiple contact printed circuit board and the receptacle 39 is preferably a multiple contact printed circuit board connector. The circuit board 40 is adapted to receive a plurality of wires 43 from a power source with the printed circuit board connector 39 likewise being adapted to receive a plurality of wires 44 from a radio and other power driven items. The printed circuit board connector 39 and the printed circuit board 40 can therefore be utilized to automatically make all power connections for delivering power from a power source to a radio and other power driven items such as external speakers, public address speakers and the like.

The body member 13 also includes an adjustable cable connector 45 for engagement with a cable plug 46 extending from the radio 11. The cable connector 45 can be attached to the body member 13 on a holder bracket 47 which is slidably mounted to one of the slots 20 in the overlapping plate 15 for adjustment of the cable connector 45 in a first direction. The holder bracket 47 includes a central opening 48 and the cable connector 45 is slidably mounted to the holder bracket 47 in the central opening 48 for adjustment of the cable connector 45 in a second direction. The holder bracket 47 is preferably L-shaped and can be secured to the slot 20 by bolts 49.

The cable connector 45 preferably includes a threaded end 50 to receive a nut 51 for securing the cable connector 45 in the central opening 48 as well as receiving a correspondingly threaded adaptor (not shown) to connect an antenna line to the cable connector 45. The end of the cable connector 45 remote from the threaded end 50 includes an adaptor 52 for telescopically receiving the cable plug 46 extending from the radio 11. The cable connector 45 is therefore well suited for automatically connecting and disconnecting an antenna line to the radio 11.

The base member 12 includes a plate 53 which is provided with a plurality of holes 54 located about the perimeter thereof for receiving conventional fastening means such as bolts (not shown) for attaching the bracket 10 to the vehicle. A central recess 55 is also provided in the plate 53 with an enlarged aperture 56 in the bottom of the recess 55. The plate 53 is particularly well suited for use in attaching the bracket 10 under the dashboard of a vehicle but it will be appreciated that the components of the bracket 10 including the plate 53 can be slightly altered for attaching the bracket 10 in other locations such as on top of the dashboard or on the floor board of the vehicle without departing from the invention.

The body member 13 includes generally centrally located enlarged slots 57 and 58 which register in the overlapping plates 15 and 16. The enlarged slots 57 and 58 and the enlarged aperture 56 cooperate with the connecting means 14. The connecting means 14 includes a bolt 59 extending through the enlarged slots 57 and 58 and extending through the enlarged aperture 56. The bolt 59 secures the body member 13 to the base member 12 by cooperating with a nut 60. A washer 61, which is preferably a wavy washer, is disposed between the base member 13 and the body member 12 on the bolt 59 to facilitate swivel movement of the radio 11 on the bracket 10.

The novel bracket 10 of the present invention can quickly be adjusted and installed for use with any Citizen's Band radio, stereo tape player, or conventional radio. The rails 27 and 28 which are preferably constructed of a rigid plastic material that is self lubricating with metal channels can be quickly attached to opposing sides of a radio on the housing thereof by means of a double-backed pressure sensitive adhesive which is substantially vibration proof and not affected by ordinary variations in temperature. The tapered ends 37 and 38 are permitted to extend rearwardly slightly beyond the housing of the radio 11 when the rails 27 and 28 are attached and the rail 28 having the printed circuit board connector 39 integral therewith is attached to the side of the radio 11 adjacent the power receiving wires 43. The wires 43 can quickly be attached to the printed circuit board connector 39 in a conventional manner after which the bracket 10 can be adjusted.

The bracket 10 is adjusted by loosening the bolt 19 associated with the pair of slots 17 and 18 and loosening the bolt 22 associated with the slots 20 and 21 and sliding the overlapping plates 15 and 16 until the width of the body member 13 is such that the channels 23 and 24 will slidably receive the rails 27 and 28. The bolts 19 and 22 are tightened after the body member 13 has been suitably adjusted and the bolt 59 is then inserted through the enlarged slots 57 and 58 in the body member 13 and the enlarged aperture 56 in the base member 12 with the washer 61 disposed between the base member 12 and the body member 13 on the bolt 59. The nut 60 is then threadably attached to the bolt 59 and tightened enough to support the body member 13 on the base member 12 while placing a slight tension on the washer 61 to facilitate relative swivel movement of the radio 11 on the bracket 10.

The base member 12 can then be attached to the vehicle at a suitable location such as under the dashboard by using the holes 54 in the plate 53 and a conventional fastener such as bolts. The plate 53 can be attached flush to a flat surface since the nut 60 is disposed in the central recess 55 which is suitably dimensioned so that the nut 60 does not extend above the surface of the plate 53. Similarly, the offsets 25 and 26 are suitably dimensioned to more than compensate for the thickness of the head of the bolt 59 so that the bolt 59 will not interfere with sliding movement of the radio 11. The bracket 10 is then ready to receive the radio 11 for adjusting the cable connector 45.

The adjustment to the cable connector 45 is made by first sliding the rails 27 and 28 in the channels 23 and 24 until the cable plug 46 on the radio 11 is in close proximity to the cable connector 45. The bolts 49 securing the holder bracket 47 are then loosened and the holder bracket 47 is horizontally adjusted along the slot 20 until the cable connector 45 is in substantial horizontal alignment with the cable plug 46. The bolts 49 are then tightened to maintain the holder bracket in position. The nut 51 is then loosened on the threads 50 and the cable connector 45 is moved in the central recess 55 of the holder bracket 47 until the cable connector 45 is in substantial vertical alignment with the cable plug 46. The cable connector 45 can likewise include a second nut (not shown) on the opposite side of the holder bracket 47 to secure the cable connector 45 in position in conventional double nut clamping relationship. The radio 11 is pushed further onto the bracket 10 until the spring detents 31 and 32 snap into the notches 35 and 36 in the rails 27 and 28. The printed circuit board 40 will then have matingly engaged the printed circuit board connector 39 and the cable connector 45 can be extended forward or rearward by utilizing the double nut connection to suitably engage the cable plug 46 in the radio 11. The nut 51 can then be tightened against the holder bracket 47 to complete the adjustment of the bracket 10 for receiving the radio 11.

The bracket 10 is connected to a power source by using the wires 43 attached to the printed circuit board 40 and is connected to an antenna line by using the threads 50 of the cable connector 45 to threadably receive a correspondingly threaded adaptor attached to the line. A radio 11 can be used on the bracket 10 so connected without further adjustment at any time. A further adjustment can be made, however, in the event that it is desired to use a different radio 11. Furthermore, the bracket 10 can easily be removed from the vehicle and installed in another vehicle in the event that it should appear desirable to do so.

The present invention provides a bracket well suited for mounting under the dashboard of a vehicle providing a slide in, slide out mount which allows the radio to be quickly installed or removed from the vehicle. All power and antenna line connections between the vehicle and the radio are made automatically as the radio is installed and the radio can be swiveled through 360° (assuming no external obstructions) permitting it to be adjusted at different angles relative to the dashboard of the vehicle thereby facilitating manipulation of the ratio by either the driver or a passenger. Therefore, the present invention provides a bracket for mounting a radio in a vehicle which is most useful for use with any make, model, or type of Citizens' Band radio, stereo tape player, or conventional radio.

The bracket of the present invention further provides quick installation and removal features which makes it highly feasible to remove the radio mounted thereon during periods of time when the vehicle is left unattended thereby eliminating the problem of theft. The bracket is also adjustable to accommodate radios of most independent sources regardless of size. The radio can be swiveled on the bracket after it has been installed to facilitate manipulation from various locations within the vehicle. Accordingly, the present invention is designed to overcome the shortcomings of prior brackets by providing a simple, inexpensive device which can quickly and easily be used under a wide variety of conditions to provide a maximum degree of versatility in a bracket.

While in the foregoing specification a detailed description of the invention has been set forth for the purpose of illustration, variations of the details herein given may be made by those skilled in the art without departing form the spirit and scope of the invention.

I claim:

1. A bracket for mounting a radio in a vehicle comprising a base member for attaching said bracket to said vehicle, an adjustable body member for releasably receiving said radio, said body member including a pair of overlapping plates joined for relative sliding movement for adjusting the width of said body member, each of said overlapping plates terminating in a radio supporting channel with said channels facing inwardly for slidably receiving a pair of rails provided for attachment to opposing sides of said radio, each of said channels including an opening for receiving a spring detent normally urged through said opening into said channel, and means for connecting said body member to said base member for swivel movement of said radio on said bracket.

2. The bracket of claim 1 in which each of said overlapping plates includes a slot provided for guiding the relative sliding movement of said overlapping plates.

3. The bracket of claim 2 in which said slots register with a bolt joining said overlapping plates through said slots and guiding the relative sliding movement along said slots.

4. The bracket of claim 3 in which each of said overlapping plates includes a second slot provided for guiding the relative sliding movement of said overlapping plates.

5. The bracket of claim 4 in which said second slots register with a second bolt joining said overlapping plates through said second slots and guiding the relative sliding movement along said second slots.

6. The bracket of claim 1 in which each of said rails includes a notch for releasably receiving said spring detent normally urged into said channel receiving said rail.

7. The bracket of claim 1 in which each of said rails includes a tapered end for guiding said rails into said channels.

8. The bracket for mounting a radio in a vehicle comprising a base member for attaching said bracket to said vehicle, an adjustable body member for releasably for receiving said radio, said body member including a pair of overlapping plates joined for relative sliding movement for adjusting the width of said body member, each of said overlapping plates terminating in a radio supporting channel with said channels facing inwardly for slidably receiving a pair of rails provided for attachment to opposing sides of said radio, one of said rails including a power receptacle for delivering power to said radio and said body member including a power plug for delivering said power to said receptacle, and means for connecting said body member to said base member for swivel movement of said radio on said bracket.

9. The bracket of claim 8 in which said receptacle and said plug are in substantial alignment and said plug matingly engages said receptacle when said body member receives said radio.

10. The bracket of claim 9 in which said body member includes an adjustable cable connector for engagement with a cable plug extending from said radio.

11. The bracket of claim 10 in which said cable connector is attached to said body member on a holder bracket and said holder bracket is slidably mounted to one of said slots in said overlapping plates for adjustment of said cable connector in a first direction.

12. The bracket of claim 11 in which said holder bracket includes a central opening therein and said cable connector is slidably mounted to said holder bracket in said central opening for adjustment of said cable connector in a second direction.

13. The bracket of claim 8 in which said base member includes a plate for attaching said bracket to said vehicle with said plate having a central aperture for receiving a bolt.

14. The bracket of claim 13 in which said body member includes a slot in each of said overlapping plates of said body member with said slots in registration for receiving a bolt.

15. The bracket of claim 14 in which said means for connecting said body member to said base member for swivel movement includes a bolt extending through said slots in said overlapping plates and said aperture in said plate of said base member with said bolt being secured by a nut.

16. The bracket of claim 15 in which said means for attaching said body member to said base member includes a wavy washer disposed between said base member and said body member on said bolt.

* * * * *

UNITED STATES PATENT AND TRADEMARK OFFICE
CERTIFICATE OF CORRECTION

PATENT NO. : 4,063,683
DATED : December 20, 1977
INVENTOR(S) : Leslie R. Jones

It is certified that error appears in the above-identified patent and that said Letters Patent are hereby corrected as shown below:

Col. 8, line 6, delete "for" (second occurrence).

Signed and Sealed this

Sixteenth Day of May 1978

[SEAL]

Attest:

RUTH C. MASON
Attesting Officer

LUTRELLE F. PARKER
Acting Commissioner of Patents and Trademarks